United States Patent [19]

Hwang

[11] Patent Number: 4,834,898

[45] Date of Patent: May 30, 1989

[54] REAGENTS FOR MAGNETIZING NONMAGNETIC MATERIALS

[75] Inventor: Jiann-Yang Hwang, Houghton, Mich.

[73] Assignee: Board of Control of Michigan Technological University, Houghton, Mich.

[21] Appl. No.: 167,798

[22] Filed: Mar. 14, 1988

[51] Int. Cl.$^4$ .................. C01G 49/08; C04B 35/26
[52] U.S. Cl. ..................... 252/62.56; 252/62.51; 427/127
[58] Field of Search ............... 428/403, 692, 900; 427/127; 252/62.51, 62.52, 62.56

[56] References Cited

U.S. PATENT DOCUMENTS

| | | | |
|---|---|---|---|
| 3,926,789 | 12/1975 | Shubert | 209/8 |
| 4,019,995 | 4/1977 | Briggs | 252/62.53 |
| 4,094,804 | 6/1978 | Shimoiizaka | 252/62.52 |
| 4,208,294 | 6/1980 | Khalafalla | 252/62.52 |
| 4,285,819 | 8/1981 | Yen | 210/679 |
| 4,356,098 | 10/1982 | Chagnon | 252/62.51 |
| 4,430,239 | 2/1984 | Wyman | 252/62.51 |
| 4,554,088 | 11/1985 | Whitehead | 252/62.54 |

Primary Examiner—Bernard Pianalto
Attorney, Agent, or Firm—Michael, Best & Friedrich

[57] ABSTRACT

Particles of a nonmagnetic material are rendered magnetic by contacting their surfaces with a magnetizing reagent comprising water containing particles of a magnetic material, each of which has a two layer surfactant coating including an inner layer and an outer layer. The inner layer covers the magnetic particle and is a monomolecular layer of a first water soluble, organic, heteropolar surfactant containing at least 3 carbon atoms and having a functional group on one end which bonds with the magnetic particle. The outer layer coats the inner layer and is a monomolecular layer of a second water soluble, organic heteropolar surfactant containing at least three carbon atoms and having a hydrophobic end bonded to the hydrophobic end of the first surfactant and a functional group on the other end capable of bonding with the particles to be magnetized.

13 Claims, 1 Drawing Sheet

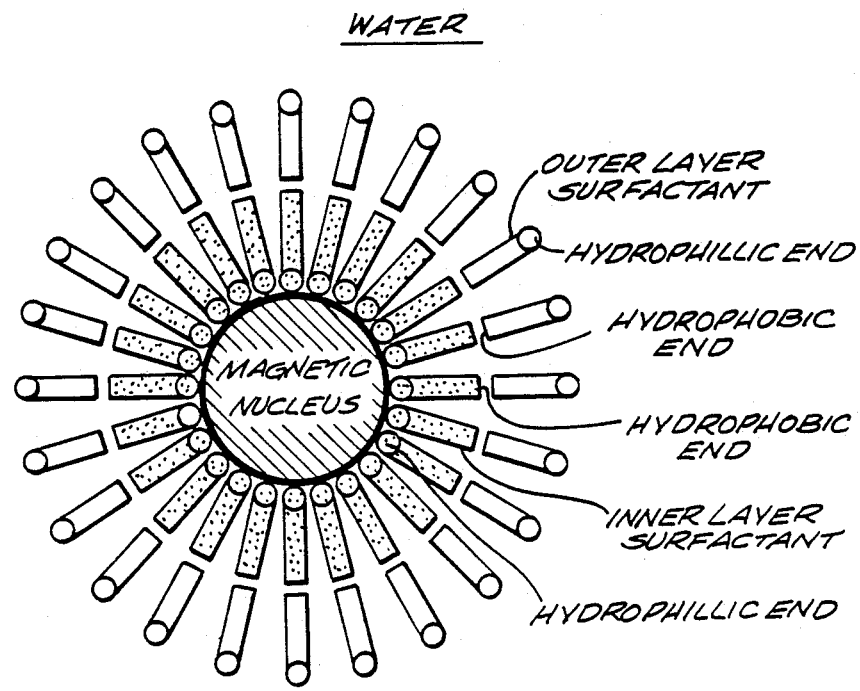

//  4,834,898

REAGENTS FOR MAGNETIZING NONMAGNETIC MATERIALS

BACKGROUND OF THE INVENTION

This invention relates to selectively magnetizing nonmagnetic or paramagnetic particles and to magnetizing reagents useful for that purpose.

Magnetic separation can be an inexpensive, selective and efficient method for separating a particulate mixture. Many techniques have been used to magnetize nonmagnetic or paramagnetic particles to permit them to be selectively separated from a mixture by magnetic separation.

For example, U.S. Pat. No. 3,926,789 to Shubert discloses wetting the surface of mineral particles with an emulsified magnetic fluid to render them magnetic. C. de Latour, *Journal of American Waterworks Association*, Vol. 68, p. 443 (1976) discloses using an inorganic coagulant, such as ferric chloride or aluminum sulfate, to agglomerate particles nonselectively in a system which contains a mixture of magnetite and other materials. J. Y. Hwang, et al., *IEEE Transactions on Magnetics*, Vol. MAG-18, No. 6, p. 1689 (1982) discloses adding an organic polymer flocculant to a mixture of magnetite and other minerals to yield a selective co-flocculation of magnetite and desired minerals.

U.S. Pat. Nos. 4,285,819 to Yen, et al. and U.S. Pat. No. 4,554,088 to Whitehead, et al. disclose methods which involve coating magnetic materials with a polymer and then coupling the polymer-coated magnetite particles to the particles to be magnetized. P. Parsonage P, *IMM Tenth Annual Commodity, Paper No. W86007* (1985) discloses introducing fine magnetite into a pulp of mineral slurries in which the desired minerals are conditioned to carry a surface charge opposite to that of magnetite to favor coating of magnetite.

U.S. Pat. Nos. 4,019,995, to Briggs, et al 4,094,804, to Shimoiizaka, 4,208,294, to Khalafalla, et al, 4,356,098 to Chagnon and 4,430,239 to Wyman disclose ferrofluids which are Newtonian liquids containing suspended, small magnetic particles which do not settle out under the influence of gravity and an external magnetic field.

SUMMARY OF THE INVENTION

An object of the invention is to provide a magnetizing reagent which is capable of magnetizing a wide variety of particulate, nonmagnetic materials.

Another object of the invention is to provide a method for selectively magnetizing a wide variety of particulate, nonmagnetic materials.

A further object of the invention is to provide a method for separating particulate nonmagnetic materials by magnetic separation.

Other objects, aspects and advantages of the invention will become apparent to those skilled in the art upon reviewing the following detailed description, the drawing and the appended claims.

The invention provides a magnetizing reagent which is capable of magnetizing a wide range of particulate nonmagnetic materials including metallic, nonmetallic, organic and biological materials. The magnetizing reagent comprises water containing particles of a magnetic material, such as magnetite, each of which is coated with a two layer surfactant coating including an inner layer and an outer layer. The inner layer covers the particle and is a monomolecular layer of a first water soluble, organic, heteropolar surfactant containing at least 3 carbon atoms and having a functional group on one end which forms a bond with the magnetic particle and a hydrophobic end. The outer layer coats the inner layer and is a monomolecular layer of a second water soluble, organic, heteropolar surfactant containing at least 3 carbon atoms and having a hydrophobic end bonded to the hydrophobic end of the first surfactant and a functional group oriented outwardly toward the water. Nonmagnetic particles are magnetized by contacting their surfaces with the magnetizing reagent in an aqueous medium and the coated magnetic particles couple with the nonmagnetic particles by adsorption.

The first and second surfactants can be nonionic, anionic or cationic. The functional group in the second or outer layer surfactant provides the coupling between the magnetic and nonmagnetic particles. Accordingly, the selectiveness of this coupling is controlled by using an outer layer surfactant having the appropriate functional group for the particles to be magnetized and the conditions of the aqueous medium in which the coupling takes place.

Particles of a nonmagnetic material in an aqueous mixture can be separated magnetically by contacting their surfaces with a magnetizing reagent to render them magnetic and then subjecting the mixture to a magnetic separation.

BRIEF DESCRIPTION OF THE DRAWINGS

The single figure is an ideal representation of a magnetizing reagent of the invention in water.

DETAILED DESCRIPTION

The magnetizing reagent of the invention includes a particulate nucleus of a magnetic material. As used herein, the term "magnetic material" means a material having ferromagnetic or strong paramagnetic properties. Suitable magnetic materials include magnetite, ferrites, hematite, maghemite, pyrrhotite and metals, alloys and compounds containing iron, nickel or cobalt. Magnetite is preferred because of its lower cost. The magnetic material may be derived from various sources. For example, magnetite may be obtained from ores and prepared by grinding or by the so-called wet method. Colloidal magnetite can be precipitated by reacting solutions of ferrous and ferric salts with alkali metals in accordance with the procedure described by W. C. Elmore, *Physical Review, Series II*, Vol. 54, p. 309 (1938). The size of magnetite and ferrite produced by the wet method usually ranges from about 70 angstroms up to 10 or more micrometers.

The particle size of the magnetic material is not particularly critical. Generally, the particle size can range from about 50 angstroms up to 10 micrometers or even higher. Coarser materials have a greater tendency to agglomerate. Such agglomerates can be broken down by a demagnetizing treatment or an ultrasonic dismemberation.

The surfactants, also known as surface active agents, used for the inner and outer layers are substances which exhibit a marked tendency to adsorb at a surface or interface. The surfactants are water soluble or miscible and organic compounds containing 3 or more carbon atoms and having a heteropolar molecule including a functional group or hydrophillic end and a hydrophobic end. Referring to the drawing which is an ideal representation of a magnetizing reagent of the invention in water, the surfactant forming the inner layer is adsorbed on the magnetic nucleus with the functional group or hydrophillic end oriented toward the magnetic nucleus and the hydrophobic end pointing radially outwardly. The surfactant forming the outer layer is adsorbed in the opposite direction with the functional group or hydrophillic end oriented toward the water. In actual practice, the hydrophobic ends of the two surfactants may mesh rather than meeting end to end as illustrated in the drawing.

The surfactants used for the inner and outer layers can be various anionic, cationic or nonionic organic surfactants having a hydrophillic functional group and containing 3 or more carbon atoms. The surfactants can be short chain types having a molecular weight as low as about 140 and long chain types containing up to about 120 carbon atoms or more and having a molecular weight up to 20,000 or more. The specific type surfactant used for each layer depends primarily on the nature of the particles to be magnetized with the magnetizing reagent as described in more detail below. This is particularly true for the outer layer surfactant because its functional group is responsible for coupling the magnetic reagent to nonmagnetic particles.

Suitable anionic surfactants include carboxylates, such as caprilic acid, lauric acid, oleic acid and polyoxyethylene sorbitan monolaurate; xanthates, such as sodium isopropyl xanthate, sodium isobutyl xanthate, potassium amyl xanthate, potassium hexyl xanthate and potassium nonyl xanthate; dithiophosphates, such as sodium dialkyl dithiophosphate and aryl dithiophosphoric acid; phosphates, such as polyoxyethylene dinonyphenyl ether phosphate; hydroxamates, such as potassium hexyl hydroxamate and alkyldimethyl ammonium hydroxamate; sulfonates, such as petroleum sulfonate and ammonium lignin sulfonate; sulfonsuccinates, such as sodium dioctyl sulfonsuccinate; taurates, such as sodium-N-methyl-N"coconut oil acid"-taurate; and sulfates, such as sodium cetyl sulfate and sodium lauryl sulfate.

Suitable cationic surfactants include amines, such as hydrogenated-tallowamine acetate, oleyl primary amine acetate, lauric amine, $C_{8-10}$ oxypropyl amine, trimethylsoy ammonium chloride, 3-aminopropyltrimethoxysilane, primary isodecyl ether amine acetate, coco-amine acetate, tallow-amine acetate and rosinamine acetate.

Suitable nonionic surfactants include ethers, such as monopentacosane triethyleneglycol ether, monotricosane diethyleneglycol ether, polyoxyethylene-10-oleyl ether, polyoxyethylene-20-oleyl ether, polyoxyethelene-4-lauryl ether, polyoxyethelene-10 lauryl ether and polyoxyethelene-23-lauryl ether and alcohols, such as cresol, alpha-(isooctylphenyl)-omega-hydroxypoly(oxy-1,2-ethane-diyl), alpha-triecyl-omega-hydroxy-poly (oxy-1,2-ethane-diyl).

The inner and outer layers can be formed by any combination of surfactant charge types. That is, the inner and outer layers can be formed by two anionic surfactants, two cationic surfactants, two nonionic surfactants, one nonionic surfactant and one anionic or one cationic surfactant, or one cationic surfactant and one anionic surfactant. Also each layer can be a mixture of surfactants.

The magnetizing reagent can be prepared by first conditioning particles of a magnetic material in water with the surfactant forming the inner layer at a surfactant concentration high enough to provide a monomolecular layer of the inner layer surfactant completely covering the surfaces of the magnetic particles. As used herein, the term "monomolecular layer" means a single molecular layer of one surfactant or a mixture of surfactant when more than one is used for the inner and/or outer layers.

A suitable acid or base, such as sodium hydroxide or hydrochloric acid, may be added to promote dissolution of the inner layer surfactant. After a monomolecular layer coating of the inner layer surfactant has been obtained, the excess inner layer surfactant is removed from the coated magnetic particles by washing with water or the like. Since the functional group of the inner layer surfactant interacts with the magnetic material, the functional group (hydrophillic end) orients toward the magnetic material and the hydrophobic end points radially outwardly from the magnetic material as illustrated in the drawing.

After removal of the excess inner layer surfactant, the coated magnetic particles are conditioned in water with a sufficient amount of the surfactant for forming the outer layer at a surfactant concentration high enough to provide a monomolecular layer of the outer layer surfactant over the inner layer surfactant and form an aqueous magnitizing reagent. A suitable acid or base may be added to promote dissolution of the outer layer surfactant. Because of a hydrophobic interaction, the outer layer surfactant is adsorbed on the inner layer surfactant with the hydrophobic end attracted toward the inner layer surfactant and the functional group (hydrophillic end) pointing radially outwardly toward the water as illustrated in the drawing.

Difficulties may be encountered when attempting to coat an anionic inner layer surfactant with a cationic outer layer surfactant, and vice versa, because of the opposite charges. This difficulty can be alleviated by washing the single coated magnetic material with a suitable polar solvent, such as ethanol, after removal of the excess inner layer surfactant. When larger particles of magnetic materials are used as the nucleus, it may be necessary to subject the resulting magnetizing reagent to a demagnetizing or ultrasonic treatment as mentioned above.

The following examples are presented to exemplify preparation of magnetizing reagents of the invention from a variety of surfactants and should not be considered as limitations to the invention.

EXAMPLE 1

Colloidal magnetite was prepared by the wet method. 3.4 g $FeSO_4 \cdot 7H_2O$ and 4.8 g $FeCl_3 \cdot 6H_2O$ were dissolved in 10 ml water and 10 ml of concentrated ammonia solution (56%) was added with rapid mixing to yield magnetite precipitates. The solution was heated to boiling (about 90° C.) and the average size of the precipitated magnetite particles increased from about 70 to about 90 angstroms. The magnetite particles were collected on a magnet, washed with water to remove the residual salts and a yield of about 2.2 g of magnetite particles was obtained.

EXAMPLE 2

0.8 g of lauric acid was added to an aqueous slurry the colloidal magnetite prepared in Example 1 (2.2 g colloidal magnetite in 10 ml water) and 5 drops of a 10 N sodium hydroxide solution were added to improve the dissolution of lauric acid. The slurry was heated at 80° C. for 30 minutes to aid the adsorption of lauric acid onto the magnetite. Hydrochloric acid was then added to the slurry until the lauric acid-coated magnetite agglomerated. The agglomerates were concentrated, held by a magnet and the solution decanted. The agglomerates were further washed with water to remove excess lauric acid. The resulting agglomerates of magnetite coated with a monomolecular layer of lauric acid had the consistency of a greasy gum. 0.5 g of sodium dioctyl sulfonsuccinate and sufficient water to make a total volume of 10 ml were added to the agglomerates to obtain a peptized product which is a magnetizing reagent of the invention, i.e., water containing magnetic particles coated with lauric acid as the inner layer and sodium dioctyl sulfonsuccinate as the outer layer.

EXAMPLE 3

Magnetite obtained from Cerac Incorporated, Milwaukee, Wisconsin and having an average particle size of 5 micrometers was used to prepare a magnetizing reagent by following the procedure described in Example 2. The resulting magnetizing reagent contained agglomerated particles, but did not have a greasy gum consistency and was well wetted by water. Placing the product on a demagnetizer improved the peptization and treating the demagnetized product with an ultrasonic probe yielded a well peptized product.

EXAMPLE 4

The procedure of Example 2 was repeated except that in separate tests lauric acid was replaced with 0.8 g caprilic acid, 0.8 g petroleum sulfonate, 0.8 g sodium oleate and 0.8 g monopentacosane triethyleneglycol ether to produce magnetizing reagents containing magnetic particles coated with sodium dioctyl sulfosuccinate as the outer layer and caprilic acid, petroleum sulfonate, sodium oleate and monopentacosane triethyleneglycol ether, respectively, as the inner layer.

EXAMPLE 5

Following the procedure in Example 2 and using sodium oleate, agglomerates of magnetite coated with a monomolecular layer of sodium oleate were first produced and then 0.5 g of the following anionic and nonionic surfactants was added to separate samples: pottasium ethyl xanthate, sodium isopropyl xanthate, sodium isobutyl xanthate, potassium amyl xanthate, sodium dialkyl dithiophosphate, aryl dithiophosphoric acid, lauric acid, sodium oleate, sodium cetyl sulfate, petroleum sulfonate, ammonium lignin sulfonate, sodium-N-methyl-N "coconut oil acid" taurate, monopentacosane triethyleneglycol ether and cresylic acid (cresols). A magnetizing reagent containing magnetic particle with two coatings was obtained with all of these surfactants as the outer layer, except potassium ethyl xanthate which has only 2 carbon atoms.

EXAMPLE 6

Following the procedure described in Example 2 and using sodium oleate, agglomerates of magnetite having a monomolecular layer coating of sodium oleate were obtained. The agglomerates were washed three times with ethanol (20 ml each time) and then three times with water (20 ml each time). The agglomerates had a greasy gum appearance. After the addition of 0.5 g lauric amine to the cleaned agglomerates, a magnetizing reagent containng magnetic particles coated with sodium oleate as the inner layer and lauric amine as the outer layer was obtained.

EXAMPLE 7

Following a procedure similar to that described in Example 2, 0.8 g lauric amine was added to a slurry of colloidal magnetite (2.2 g magnetite in 10 ml water) and 2 drops of 6N hydrochloric acid were added to enhance the dissolution of lauric amine. The slurry was heated at 80° C. for 30 minutes to aid the adsorption of lauric amine on the magnetite. Sodium hydroxide was then added to the slurry until the lauric amine coated the magnetite agglomerates. The agglomerates were concentrated, held on a magnet and the solution decanted. The agglomerates were further washed with water to remove the excess lauric amine. 0.5 g of the following cationic and nonionic surfactants were added to separate samples of the resulting lauric amine-coated magnetite: hydrogenated-tallowamine acetate, oleyl primary amine acetate, lauric amine, $C_{8-10}$ oxypropyl amine and monopentacosane triethyeleneglycol ether. All of these surfactants produced two layer magnetizing reagents.

The magnetizing reagents can be used to magnetize a wide variety of solid, particulate, nonmagnetic materials. As used herein, the terms "nonmagnetic material" and "nonmagnetic particles" means both nonmagnetic and paramagnetic materials and particles having adsorbent properties. Such materials include metallic, nonmetallic, organic and biological materials in particle sizes ranging from colloidal size molecules to fragments as large as 1 millimeter and larger.

The adsorption mechanism involved in coupling the magnetizing reagent with nonmagnetic particles is determined by the outer layer surfactant. In an aqueous environment, the magnetizing reagent reacts to solid surfaces in basically the same manner as would free molecules of the outer layer surfactant. For example, a magnetizing reagent having a xanthate outer layer surfactant will adsorb to metal sulfide surfaces in the same manner as the free xanthate surfactant in an aqueous solution. Thus, well known surface chemistry principles can be followed to control coupling and the selectivity of coupling.

Coupling is determined by one or more of the following forces between the outer layer surfactant and nonmagnetic particles: (1) non-polar van de Waals force, a relative weak attraction force which increases with the molecular weight of the outer layer surfactant, (2) hydrogen bonding force, (3) electrostatic bonding force, and (4) covalent bonding force. The last three forces are quite strong and the functional group of the outer layer surfactant plays a major role in producing them. For example, a nonionic outer layer surfactant can be adsorbed on silica by hydrogen bonding. An anionic outer layer surfactant can be adsorbed on positive charged particles due to the charge interaction between the negatively charged functional group and the positively charged particle surface. A xanthate outer layer surfactant may be chemisorbed by copper or copper sulfides through a covalent bonding of the functional group and copper.

The selectiveness of the coupling can be controlled by using an outer layer surfactant having the appropriate functional group for the material to be magnetized and the conditions of the aqueous medium in which the coupling takes place and by using modifying agents known to modify the surface properties of that material. For example, the surface charge of alumina particles in a dilute solution of a monovalent salt, such as sodium chloride, changes with changes in the pH of the solution. When the pH is 9.4, the alumina particles have a zero charge which is called the isoelectric point. When the pH is above 9.4, the alumina particles carry a negative charge and will adsorb or couple with a magnetizing reagent having a cationic outer layer surfactant. When the pH is below 9.4, the alumina particles carry a positive charge and will adsorb or couple with a magnetizing reagent having an anionic outer layer surfactant.

This applies also to other materials. If the pH of a mixture of a material and water is above or below the isoelectric point for that material, the material will couple with magnetizing reagents having an anionic outer layer surfactant and a cationic outer layer surfactant, respectively.

The surface charge of nonmagnetic particles can be modified with different types and concentrations of electrolytic modifying agents. For example, the positive charge of alumina particles in an aqueous mixture at a pH of 7 can be decreased in magnitude with an increasing concentration of anions and even changed to a negative charge at that pH in the presence of multivalent anions, such as tripolyphosphate ions. This ability to alter the surface charge, combined with a selection of the appropriate anionic or cationic outer layer surfactant, permits coupling to be controlled by electrostatic bonding.

Covalent bonding can be activated or depressed by treating magnetic particles with known surface reactive modifying agents. For example, zinc sulfide can be treated so that it will not couple with a magnetizing reagent having a xanthate outer layer surfactant by conditioning the zinc sulfide particles with a surface reactant such as an alkali cyanide. On the other hand, zinc sulfide can be activated for coupling with the same type modifying agent by conditioning with a copper salt which forms a film on the zinc sulfide particles and causes them to behave like a copper material.

The following examples exemplify the nature of the coupling mechanism between magnetizing reagents of the invention and various nonmagnetic materials and should not be construed as limitations to the invention.

EXAMPLE 8

Slurries of alumina particles were prepared by mixing 0.1 g alumina particles having an average size of 0.3 micrometers with 100 ml of an aqueous solution containing $2 \times 10^{-3}$ M NaCl to control the electrolyte concentration. The pH of each slurry was adjusted to a value within the range of 3 to 12 by adding NaOH or HCL. After conditioning for ten minutes, a dilute aqueous magnetizing reagent containing colloidal magnetite coated with different surfactants was added to each slurry. The amount added was equivalent to 0.001 ml of the concentrated magnetizing reagent which contained about 2.2 g magnetite in 10 ml. After stirring for 5 minutes, a few drops of each slurry were placed under a microscope. An iron needle backed with a magnet was then inserted into a drop of slurry and the alumina particles observed for their attraction to the magnetic needle. Results of this test are summarized in Table I below.

TABLE 1

EFFECT OF pH ON COUPLING BETWEEN MAGNETIZING REAGENTS AND ALUMIA PARTICLE

| Magnetizing Reagent | | | | pH of Alumina Slurry | | | | | | | | | |
|---|---|---|---|---|---|---|---|---|---|---|---|---|---|
| Inner Layer Surfactant | | Outer Layer Surfactant | | | | | | | | | | | |
| Type | Surfactant | Type | Surtactant | 3 | 4 | 5 | 6 | 7 | 8 | 9 | 10 | 11 | 12 |
| A | Lauric Acid | A | Sodium Dioctyl Sulfosuccinate | + | + | + | + | + | + | + | − | − | − |
| A | Lauric Acid | A | Ammonium Lignin Sulfonate | + | + | + | + | + | + | + | − | − | − |
| A | Lauric Acid | A | Sodium Lauric Sulfate | + | + | + | + | + | + | + | − | − | − |
| A | Lauric Acid | A | Sodium Oleate | + | + | + | + | + | + | + | − | − | − |
| A | Sodium Oleate | A | Sodium Dioctyl Sulfosuccinate | + | + | + | + | + | + | + | − | − | − |
| A | Sodium Oleate | A | Ammonium Lignin Sulfonate | + | + | + | + | + | + | + | − | − | − |
| C | Lauric Amine | C | Lauric Amine | − | − | − | − | − | − | − | + | + | + |
| C | Lauric Amine | C | Hydrogenated Tallowamine Acetate | − | − | − | − | − | − | − | + | + | + |
| A | Sodium Oleate | C | Lauric Amine | − | − | − | − | − | − | − | + | + | + |

Notes:
A = Anionic surfactant
C = Cationic surfactant
+ = Alumina particles attracted by magnetic needle.
− = Alumina particles not attracted by magnetic needle.

From these results, it can be seen that magnetizing reagents containing magnetic particles having an anionic surfactant as the outer layer coupled with alumina particles and rendered them magnetic at a pH of 9 below and magnetizing reagents containing magnetic particles having a cationic surfactant as the outer layer coupled with alumina particles and rendered them magnetic at a pH of 10 or above. These observations for the coupling effect of the magnetizing reagents is consistent with known electrostatic mechanism of adsorption for anionic and cationic surfactants on alumina discussed above.

EXAMPLE 9

Slurries of alumina particles were prepared in the manner described in Example 8, except that alumina particles having an average size of 100 micrometers were used. When a magnetizing reagent containing collodial magnetite coated with a sodium oleate inner layer and a sodium dioctyl sulfosuccinate outer layer was added to the slurry at a pH of 7, it was observed under a microscope that the alumina particles were attracted by a magnetic needle.

EXAMPLE 10

Slurries of various inorganic, organic, biological and metallurgical materials were prepared in a manner described in Example 8, except that quartz, calcium fluoride, kaolinite, tin oxide, alumina hydroxide, aluminum, emulsified fuel (No. 2), flour yeast bacteria and corn starch were used in place of alumina. After the addition of a magnetizing reagent containing a colloidal magnetite having an anionic lauric acid inner layer and an anionic sodium oleate outer layer, the responses of the resulting coupled particles to a magnetic needle were observed under a microscope. All of these materials were attracted to the magnetic needle at a pH above their respective isoelectric points which are: quartz=2, calcium fluoride=10, kaolinite=8, tin oxide=7, aluminum hydroxide=9, aluminum=8, emulsified No. 2 oil=5, flour yeast bacteria=6 and corn starch=7.

EXAMPLE 11

0.1 g of alumina particles were slurried in an aqueous solution containing 40 ppm $CaCl_2$ and having a pH of 11. The alumina particles were positively charged by adsorbing calcium ions on their surfaces. After addition of a magnetizing reagent containing a colloidal magnetite having an anionic sodium oleate inner layer and an anionic sodium dioctyl sulfosuccinate outer layer, it was observed under a microscope that the resulting alumina particles were attracted by a magnetic needle.

EXAMPLE 12

0.1 g alumina particles were slurried in an aqueous solution containing 20 ppm sodium tripolyphosphate and having a pH of 7. The alumina particles were negatively charged by adsorbing tripolyphosphate ions on their surfaces. After the addition of a magnetizing reagent containing a colloidal magnetic having an anionic sodium oleate inner layer and an anionic sodium dioctyl sulfosuccinate outer layer, it was observed under a microscope that the resulting alumina particles were not attracted by a magnetic needle. This is consistent with the electrostatic adsorption mechanism discussed above.

EXAMPLE 13

Slurries were prepared in the manner described in Example 8, except that alumina was replaced in separate samples by Cu, CuS and $Cu_2S$. A xanthate magnetizing reagent containing a colloidal magnetite having a sodium oleate inner layer and a potassium amyl xanthate outer layer was added to samples of each slurry with the pH within the range of 3 to 12. It was observed under a microscope that all the resulting copper oompounds were attracted by a magnetic needle. This coupling of a xanthate magnetizing reagent to the copper particles is consistent with well known copper floatation surface chemistry, i.e., xanthates are adsorbed on copper compounds at the above pH range through an xanthate-Cu covalent bonding.

Dithiophosphates are also known to covalently bond to copper. When the above xanthate magnetizing reagent was replaced by a dithiophosphate magnetizing reagent containing a colloidal magnetite having a sodium oleate inner layer and a sodium diisopropyl dithiophosphate outer layer or a sodium aryl dithiophosphoric acid outer layer, it was observed under a microscope that the resulting cooper compounds were magnetic.

EXAMPLE 14

As mentioned above, it is known that the adsorption of xanthate on zinc sulfide can be depressed by treatment with an alkali cyanide and activated by treatment with copper salts. The following test demonstrates that coupling of a xanthate magnetizing reagent with zinc sulfide is consistent with this adsorption mechanism. 0.1 g zinc sulfide was first conditioned in 100 ml of an aqueous solution containing 20 ppm potassium cyanide and having a pH of 7. A xanthate magnetizing reagent containing a colloidal magnetite having a sodium oleate inner layer and a potassium amyl xanthate outer layer was added and stirred. After these treatments, it was observed under a microscope that the zinc sulfide was not attracted by a magnetic needle. On the other hand, zinc sulfide was rendered magnetic by the xanthate magnetizing reagent when zinc sulfide was first conditioned at a pH of 7 with 20 ppm copper sulfate instead of potassium cyanide.

EXAMPLE 15

10 g of -325 mesh quartz and 10 g of -325 mesh $Cu_2S$ were mixed in 400 ml of an aqueous slurry having a pH of 10. 0.8 g sodium silicate was added as a modifying agent to improve the dispersion of particles and to protect the quartz surface against xanthate adsorption. After conditioning for 10 minutes, 0.01 ml of a xanthate magnetizing agent containing a colloidal magnetite having a sodium oleate inner layer and a potassium amyl xanthate outer layer was added. After an additional three minutes of conditioning, the slurry was introduced into a high gradient magnetic separator employing ferromagnetic stainless steel balls as the packing matrix. The field strength of the separator was 8.5 kilogauss and the throughput rate of the slurry was 1 cm/sec. Magnetic particles were collected on the magnetic matrix and nonmagnetic particles passed through the system and were collected. After turning off the magnetic field, the magnetic particles were flushed from the system and the two separation products were examined under a microscope. Copper sulfide was concentrated in the magnetic fraction and quartz was concentrated in the nonmagnetic fraction. Thus, the xanthate magnetizing reagent selectively coupled with the copper sulfide.

EXAMPLE 16

0.1 g of alumina particles having an average size of 0.3 micrometers was mixed in 100 ml of an aqueous solution containing $2\times10^{-3}$ M NaCl and having a pH of 7. 0.005 ml of an anionic magnetizing reagent prepared in Example 3 was added to the resulting slurry. This magnetizing reagent employed a magnetite having a larger average size (5 micrometers) than the collidal magnetite employed in Examples 7-15. Despite the larger particle size, the alumina particles were rendered magnetic by this treatment. On the other hand, it was observed that, if the pH of the alumina slurry is 10 or more before the addition of the same magnetizing reagent, the aluminum particles were not rendered magnetic.

These results are consistent with those obtained with a magnetizing reagent including a collodial magnetite and demonstrate that coupling through the outer layer surfactant of the magnetizing reagent is effective even when larger size particles are used as the magnetic nucleus.

EXAMPLE 17

1.0 g of kaolinite was mixed with separate 50 ml samples of an aqueous mixture containing a nonionic magnetizing reagent prepared in Example 5 and having an outer layer of monopentacosane triethylene glycol ether. The dosage of magnetizing reagent in each sample was varied. After conditioning for 10 minutes, the kaolinite was separated by filtering, dried and a measurement made for magnetic susceptibility. At a dosage of magnetizing reagent containing $6.5 \times 10^{-4}$ g magnitite, the magnetic susceptibility of the kaolinite increased from zero at $10^{-6}$ cgs/g sensitivity to $1.07 \times 10^{-4}$ cgs/g. At dosages of $1.3 \times 10^{-4}$, $2.6 \times 10^{-4}$ and $1.3 \times 10^{-3}$ g, the magnetic susceptibility of kaolinite was $3.88 \times 10^{-5}$, $6.62 \times 10^{-5}$ and $1.39 \times 10^{-4}$ cgs/g, respectively.

From these results, it can be seen that a nonionic magnetizing reagent of the invention absorbs onto a silica surface through a hydrogen bonding mechanism.

The magnetizing reagents can be used to convert processes which employ conventional surfactants to magnetic separation processes. This can be accomplished by simply replacing the conventional surfactant with a magnetizing reagent having the same surfactant outer layer. Conceivably, all or at least most, flotation processes employing heteropolar surfactants as a collector can be converted to a magnetic separation process by using magnetic reagents of the invention. For example, some conventional froth flotation processes for separating copper sulfide from other minerals employ xanthate surfactants which adsorb on the copper sulfide. Such processes can be converted to a magnetic separation process by coupling copper sulfide with magnetizing reagents containing magnetic particles having a xanthate outer layer surfactant.

The magnetizing reagents can be used for a number of new applications in which it would be advantageous to magnetize nonmagnetic particles. For example, magnetic fields can be used to control movement or localization of nonmagnetic particles rendered magnetic by coupling with a magnetizing reagent. Movement of normally magnetic particles which have been coupled with a magnetizing reagent can be tracked with magnetic detectors. The magnetizing reagents can be used in a wide variety of particle processing applications involving separation, filtration, concentration, immobilization, targeting or tracing particles. For example, a mixture of nonmagnetic particles can be selectively magnetized and the magnetized ones separated magnetically. Magnetized particulate chemical reactants, such as catalysts, enzymes, etc., can be immobilized magnetically. Magnetized drugs can be targeted for a specific location in a patient's body or, once delivered to the body, tracked by magnetic detectors.

From the foregoing description, one skilled in the art can easily ascertain the essential characteristics of the invention and, without departing from the spirit and scope thereof, make various changes and modifications to adapt it to various usages.

I claim:

1. A reagent for magnetizing particles of a nonmagnetic material comprising water containing particles of a magnetic material, each of said magnetic particles having a two layer surfactant coating including an inner layer and an outer layer, said inner layer covering said magnetic particle and being a monomolecular layer of a first water soluble, organic heteropolar surfactant containing at least 3 carbon atoms and having a functional group on one end which forms a bond with said magnetic particle and a hydrophobic end, and said outer layer coating said inner layer and being a monomolecular layer of a second, water soluble, organic heteropolar surfactant containing at least 3 carbon atoms and having a hydrophobic end bonded to the hydrophobic end of said surfactant and a functional group on the other end oriented outwardly toward the water.

2. A reagent according to claim 1 wherein said first and second surfactants are nonionic, anionic or cationic.

3. A reagent according to claim 2 wherein both said first and second surfactants are anionic.

4. A reagent according to claim 2 wherein both said first and second surfactants are cationic.

5. A reagent according to claim 2 wherein both said first and second surfactants are nonionic.

6. A reagent according to claim 2 wherein said first surfactant is anionic and said second surfactant is cationic or nonionic.

7. A reagent according to claim 2 wherein said first surfactant is cationic and said second surfactant is anionic or nonionic.

8. A reagent according to claim 2 wherein said first surfactant is nonionic and said second surfactant is anionic or cationic.

9. A reagent according to claim 2 wherein said magnetic particles are magnetite.

10. A reagent according to claim 9 wherein said particles have an average size ranging from about 50 angstroms up to about 10 micrometers.

11. A reagent according to claim 2 wherein said nonionic surfactant is an ether or alcohol.

12. A reagent according to claim 2 wherein said anionic surfactant is a carboxylate, xanthate, dithiophosphate, phosphate, hydroxamate, sulfonate, sulfonsuccinate, taurate or sulfate.

13. A reagent according to claim 2 wherein said cationic surfactant is an amine.

* * * * *